United States Patent [19]
Kirk

[11] Patent Number: 6,055,100
[45] Date of Patent: Apr. 25, 2000

[54] DOUBLET BASED LARGE APERTURE FREE SPACE IMAGING SYSTEM

[75] Inventor: Ronald L. Kirk, Findlay, Ohio

[73] Assignee: ATL Corporation, Findley, Ohio

[21] Appl. No.: 09/022,315

[22] Filed: Feb. 11, 1998

[51] Int. Cl.[7] ............ G03B 21/60; G03B 21/14; G02B 27/22; G02B 3/08
[52] U.S. Cl. ............ 359/457; 359/478; 359/565; 359/742; 359/743; 353/38
[58] Field of Search ............ 359/742, 726, 359/478, 565, 743, 457, 460; 353/38

[56] References Cited

U.S. PATENT DOCUMENTS

| | | |
|---|---|---|
| 4,391,495 | 7/1983 | Mazurkewitz ............ 359/457 |
| 4,484,219 | 11/1984 | Kirk . |
| 4,566,031 | 1/1986 | Kirk . |
| 4,671,625 | 6/1987 | Noble . |
| 5,379,133 | 1/1995 | Kirk . |

FOREIGN PATENT DOCUMENTS 0129410  8/1983  Japan ............ 359/742

OTHER PUBLICATIONS

Cox, Arthur. Application of Fresnel Lenses to Virtual Image Display. Proceedings of the Society of Photo–Optical Instrumentation Engineers, San Diego, CA, USA, pp. 130–137, Aug. 31, 1978

*Primary Examiner*—Cassandra Spyrou
*Assistant Examiner*—Jennifer Winstedt
*Attorney, Agent, or Firm*—Mueller and Smith, LPA

[57] ABSTRACT

A free space imaging system utilizing a doublet form of optic. The doublet is configured with two large Fresnel lenses configured such that their echelon groove components are mutually oppositely disposed within the optical path of the system. The method includes an arrangement wherein the output focal plane deliberately is curved and generated with a relatively wide field of view to evoke an emulation of three-dimensionality.

31 Claims, 5 Drawing Sheets

DOUBLET BASED LARGE APERTURE FREE SPACE IMAGING SYSTEM

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Technologists and the consuming public have held a fascination with three-dimensional viewing systems essentially since the advent of practical photography. Early scenes were viewed through parallax-based stereopticon or magic lantern devices. In time, the image dynamics of cinematography appeared, leading to parallax-based three-dimensional imaging in that field which was viewed with dual-colored or polarized lens based eyewear. More currently, stereo vision has been offered in conjunction with liquid crystal shutter containing goggles and in connection with the helmets employed with virtual reality-based systems.

Complex but precise three-dimensional systems evolved with that brand of interferometry known as holography and the emergence of holographic film in conjunction with the practical laser. Advancing technology also turned to what has been termed "real time" holography where a spatial light modulator is electronically driven to achieve an electronic reconstruction display of a three-dimensional holographic image. Through resort to highly miniaturized grid matrix technology, the fringe pattern itself is constructed electro-optically. Such technology is, for example, described in U.S. Pat. No. 4,494,219 by Kirk, entitled "Electrically Generated Holography", issued Nov. 20, 1984. Improvements to the spatial modulator component of this technology are described in U.S. Pat. No. 4,566,031 by Kirk, entitled "Spatial Light Modulation with Application to Electrically Generated Holography", issued Jan. 21, 1986. Technology addressed to reducing the complexity of holographic based stereoscopic imaging looked, for example, to the utilization of a cathode ray tube carrying real images of the scene or images generated with computer graphics in conjunction with a holographic integrating combiner screen. Such combiner screens function to form a number of fringe-pattern defined optical components having a corresponding number of spaced-apart back focal planes or points, each of which transmits an image sample from a synthetic aperture to a forward focal point. The output positions are spaced mutually laterally to achieve a binocular perspective viewing at a zone located at one or more viewing stations. These systems are described by Kirk in U.S. Pat. No. 5,379,133, issued Jan. 3, 1995, entitled "Synthetic Aperture-Based Real Time Holographic Imaging".

More recently, interest has developed in the generation of relatively inexpensive images in free space. Such systems have application, for example, in connection with advertising at points of sale or in developing corporate images or for forming free space images for trade shows and the like. Other utilization for such imaging is in museums or more casual environments where the casual observer is not called upon to use eyewear or any such implements. However, the free space type of image represents an attractive or entertaining feature. To the present, the systems evolved have taken advantage of the large apertures available with Fresnel forms of lenses but have exhibited severely limited fields of view for the observer, substantial light scattering problems, and a lack of appreciable three-dimensional attributes.

BRIEF SUMMARY OF THE INVENTION

The present invention is addressed to a system and method for generating image in free space through the utilization of relatively large aperture optics. These large aperture optics are fashioned from Fresnel lenses configured as a doublet to perform as a single optical component. Operating in conjunction with the luminous transmission object such as a CRT or the like, the Fresnel-formed doublet achieves substantial imaging improvement in terms of mage contrast or signal-to-noise ratio and field of view. As an important aspect of achieving this imaging feature, the doublet utilized within the system employs Fresnel lenses where the echelon grooves forming them are mutually oppositely disposed within the optical path. In this regard, depending upon the system design called for, the echelon grooves face either mutually inwardly toward each other or mutually outwardly away from each other. The echelon grooves within the system and method of the invention do not face in the same direction.

Doublet structuring lens importantly affords the designer an opportunity to achieve control of such attributes as the shape of the output focal plane. In this regard, the output focal plane may be substantially planar, or deliberately may be warped or curved with the purpose of developing an emulation of three-dimensional effects with respect to the image which is coincident with such curved focal plane. When an otherwise flat image as derived from a CRT system is projected to such a curved focal plane, a form of object parallax is evoked wherein the observer observes portions of the originally flat image at either side of the curved focal plane. The attributes of chromic aberration may be employed in conjunction with this warped focal plane with the observation that each component from the red region of the visible spectrum will appear more forwardly projected in space, than for instance images in the blue region. Inasmuch as the doublet and associated Fresnel echelon groove configuration of the system is employed, this curved output focal plane may be generated in conjunction with relatively wide fields of view to permit observer or eye station motion about the projected focal plane and coincident image such that human cognition will tend to synthesize and interpret a three-dimensional effect.

The invention, accordingly, comprises the system and method possessing the construction of elements, arrangement of parts and steps which are exemplified in the following detailed description.

For a fuller understanding of the nature and objects of the invention, reference should be had to the following detailed description taken in connection with the accompanying drawings.

DETAILED DESCRIPTION OF THE INVENTION

The present imaging system is one which does not employ holography but utilizes luminous transmissive objects to generate a real image in free image space. A salient aspect of the system resides in the utilization of very large aperture lenses implemented as Fresnel lenses which are combined optically as a doublet. In a transmission mode, Fresnel lenses exhibit typical attributes of refraction and diffraction. By adjusting the spacing between the Fresnel lenses comprising the doublet, chromatic astigmatism can be corrected. However, with the invention, the phenomenon of chromatic astigmatism deliberately is combined with a doublet configuration producing a warped or distorted output focal plane. Such distortion can be produced to construct a real image in free space, which emulates a substantial portion of a sphere, for example up to about 270° of a sphere. By designing the system to evoke a substantial field of view, for example between about 60 and 90°, the observer may move about such a curved image and cognitively achieve what is referred to as "object parallax" as opposed to spatial parallax. In this regard, the image generator of the system produces a luminous transmission object which, in a typical application, is flat and only one such image is produced. Accordingly, an image of the surface of a planet may be projected to an output focal plane which is warped to emulate a spherical focal plane and the observer will observe the surface of the planet as it varies from one side of the sphere to the other. The system also enjoys the attribute of creating this real image at a system forward focal length, placing it beyond any confining enclosure. In effect, the observer can walk through the image.

Figure 1:
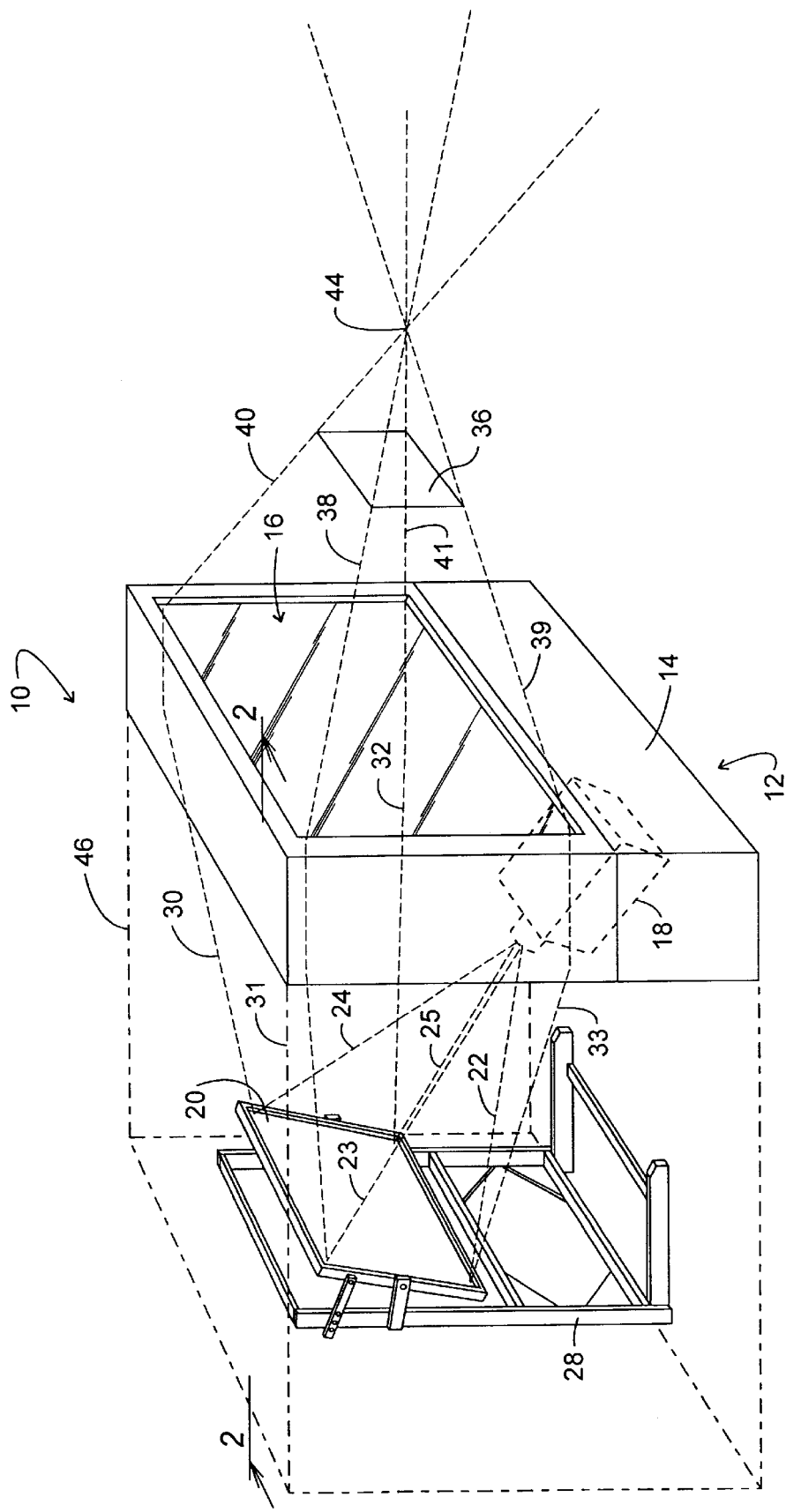
FIG. 1 is a perspective view of one embodiment of the imaging system of the invention.

Looking to FIG. 1, a larger embodiment of the imaging system is represented generally at 10. System 10 is configured having an optical doublet represented generally at 12 which is formed of two large planar Fresnel lenses mounted in parallel adjacency within a cabinet 14. The exit optic or aperture of the doublet 12 is shown as large planar Fresnel lens 16. The Fresnel lens 16 component of doublet 12 is supported by the cabinet 14 at a height above floor level for accommodating standing observers. Typically, the cabinet 14 is mounted within or is formed as part of an inner wall of a building. For the present embodiment, the imaging system behind the doublet 12 includes an image generator depicted in phantom as a projection video device 18. Decice 18 projects an image to a video screen 20 to thus create a luminous transmission object at the screen 20. Such projection is represented by the projection lines 22–25. Screen 20 is seen mounted upon an L-shaped stand 28. The luminous transmission object at screen 20 is transmitted to the entrance Fresnel lens (not shown) of the doublet 12 as represented by projection lines 30–33 representing the common optical path within which doublet 12 is positioned. Doublet 12 generates a real image in free space as represented at projected image 36. Preferably, the image 36 is demagnified or reduced in size with respect to the luminous transmission object at the screen 20. In a preferred arrangement, the size of the projected image 36 is one-half of that of the object 20. In this regard, where video devices such as the projection video 18 or a computrr monitor are utilized, an image which is developed having a pixel-based raster of 640 pixels by 480 pixels, the projected image at focal plane 36 will appear as 1280 pixels by 960 pixels when compared with the image at 20. The forward projection lines from the doublet 12 are seen at 38–41 and converge at a vertex 44 from which they emerge to define vertically designated and horizontally designated fields of view. Only rearwardly of the doublet 12, the optical system is confined, in that stray illumination or illumination other than that generated at screen 20 is blocked. Typically, this is provided by a room which is located behind a wall within which the cabinet 14 is mounted. This confinement region is represented at dashed boundary 46. As is apparent, the region 46 does not extend in front of the doublet 12 exit aperture 16. A typical size for the system embodiment shown at 10 will provide an image or luminance transmission object at screen 20 which is 30 inches (76 cm) high and 40 inches (101.6 cm) wide. The forward or output focal plane at 36 will be 15 inches high (38 cm) and 20 inches wide (50.8 cm) and be positioned about 37 inches (94 cm) forwardly from the exit aperture 16 of doublet 12. The Fresnel lenses forming doublet 12 will have a height of 60 inches (1.52 m) and a width of 90 inches (2.29 m).

Figure 2:
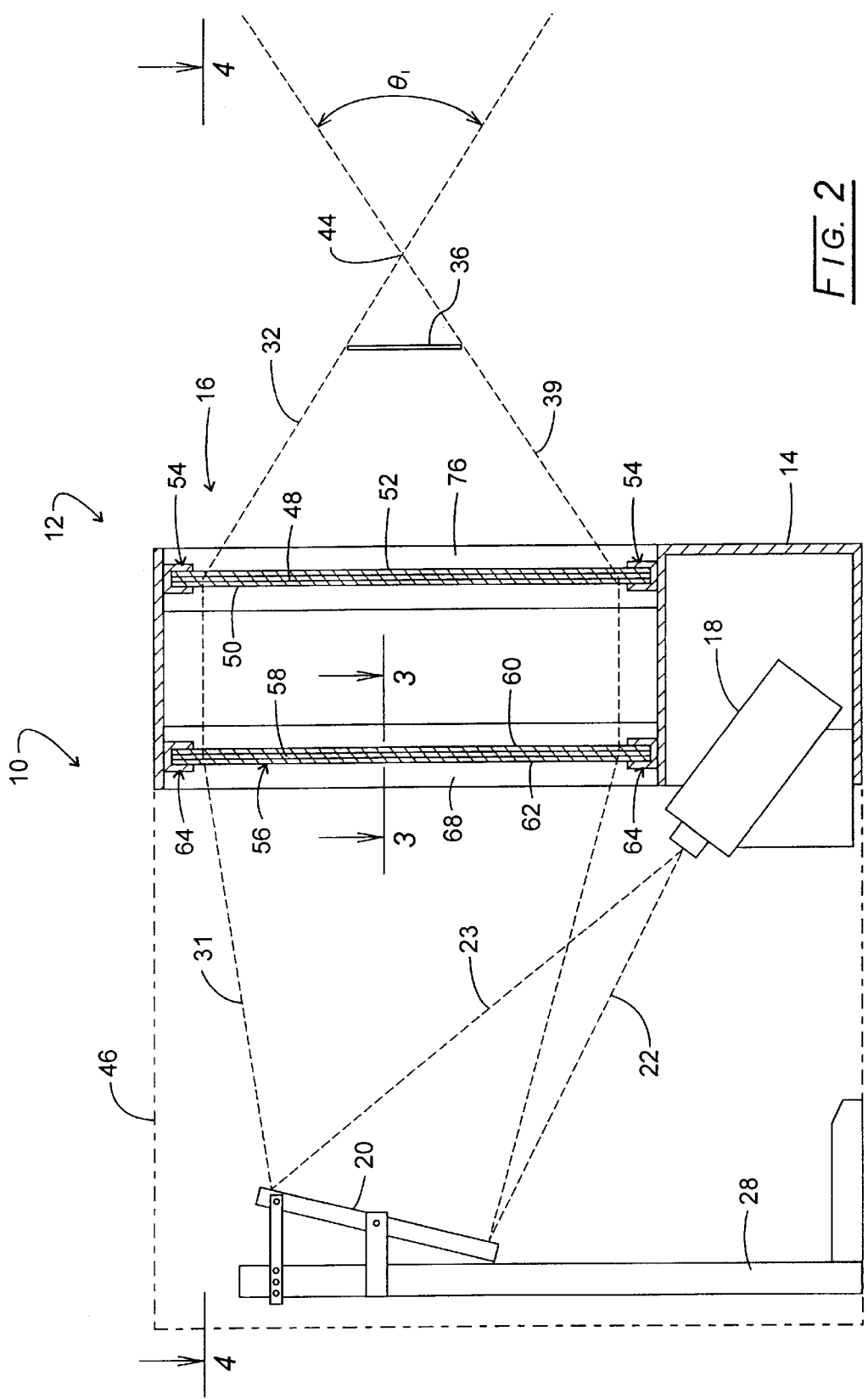
FIG. 2 is a sectional view taken through the plane 2—2 shown in FIG. 1.

Looking to FIG. 2, the structure of doublet 12 is revealed. In the figure, the exit aperture 16 is formed of a large Fresnel lens 48 typically formed of an acrylic which is sandwiched between supporting plexiglass plates 50 and covered by a clear plexiglass cover 52. This composite is secured by a rectangular frame represented generally at 54.

The entrance aperture of the doublet 12 is represented generally at 56. This optic is provided as a large Fresnel lens 58 which is mounted in parallel with lens 48 and, as in the case of exit aperture 16, is sandwiched between a supporting plexiglass sheet 60 and a forward plexiglass cover 62. The entire arrangement is secured, as before, by a rectangular frame represented generally at 64. Also seen in FIG. 2 is the vertical field of view represented as angle $\theta_1$. For the embodiment shown, this field of view is computed as 60°.

Figure 3:
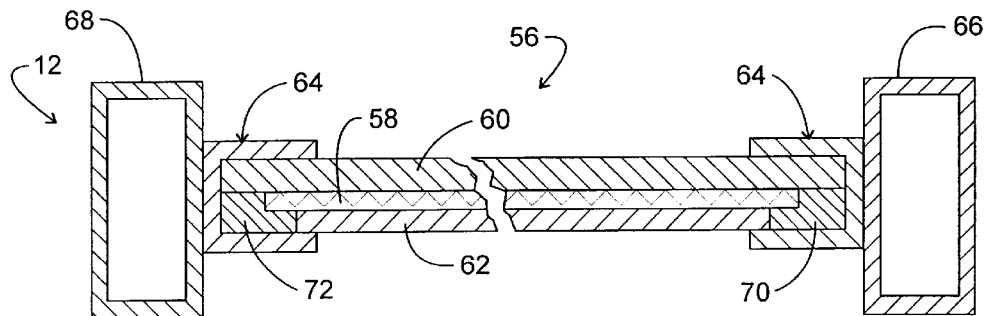
FIG. 3 is a sectional view taken through the plane 3—3 in FIG. 2.

Referring to FIG. 3, the structuring of the Fresnel lenses of the doublet 12 is shown in more detail, the entrance aperture 56 being utilized as an example. In the figure, the frame 64 is seen supported by two upstanding box beams 66 and 68. The C-channel frame 64 is seen to surmount and support transparent plexiglass support panel 60 against which the acrylic Fresnel lens 58 is positioned. Lens 58 is retained against the plexiglass support panel 60 by a transparent plexiglass cover 62. Step strips as seen at 70 and 72 complete the assembly.

An important design criteria for all of the systems configured according to the invention is that the echelon grooves of the Fresnel lenses as at 48 and 58 be mutually oppositely oriented within the common optical path. In the example of FIGS. 1–4, the echelon grooves face mutually outwardly in defining the doublet 12. For other embodiments, the echelon grooves may face mutually inwardly toward each other within the common optical path. The echelon grooves typically are configured with a pitch of about 0.5 mm. While smaller pitches are available, for example, to about 0.05 mm, the integrity of the echelon grooves appears to suffer with such smaller pitches. Additionally considered in conjunction with the mutual opposite orientations of the echelon groove is the formation of the grooves themselves during manufacture. Certain of the lenses, for example those marketed by Fresnel Optics, Inc. of Rochester, N.Y., are configured in positive relief. In this regard, the ridges of the echelon grooves extend above the level of the starting outer surface of the acrylic material from which they are formed. Another form of Fresnel lens are formed in negative relief, in that the echelon grooves extend below the surface of the starting acrylic material. Negative relief Fresnel lenses are marketed, for example, by RHK International of Tokyo, Japan. Positive relief Fresnel lenses are used in the doublets of the invention in the opposite orientational sense as negative relief Fresnel lenses. For the system 10, positive relief Fresnel lenses are used and those lenses FACE mutually outwardly within the common optical path.

Figure 4:
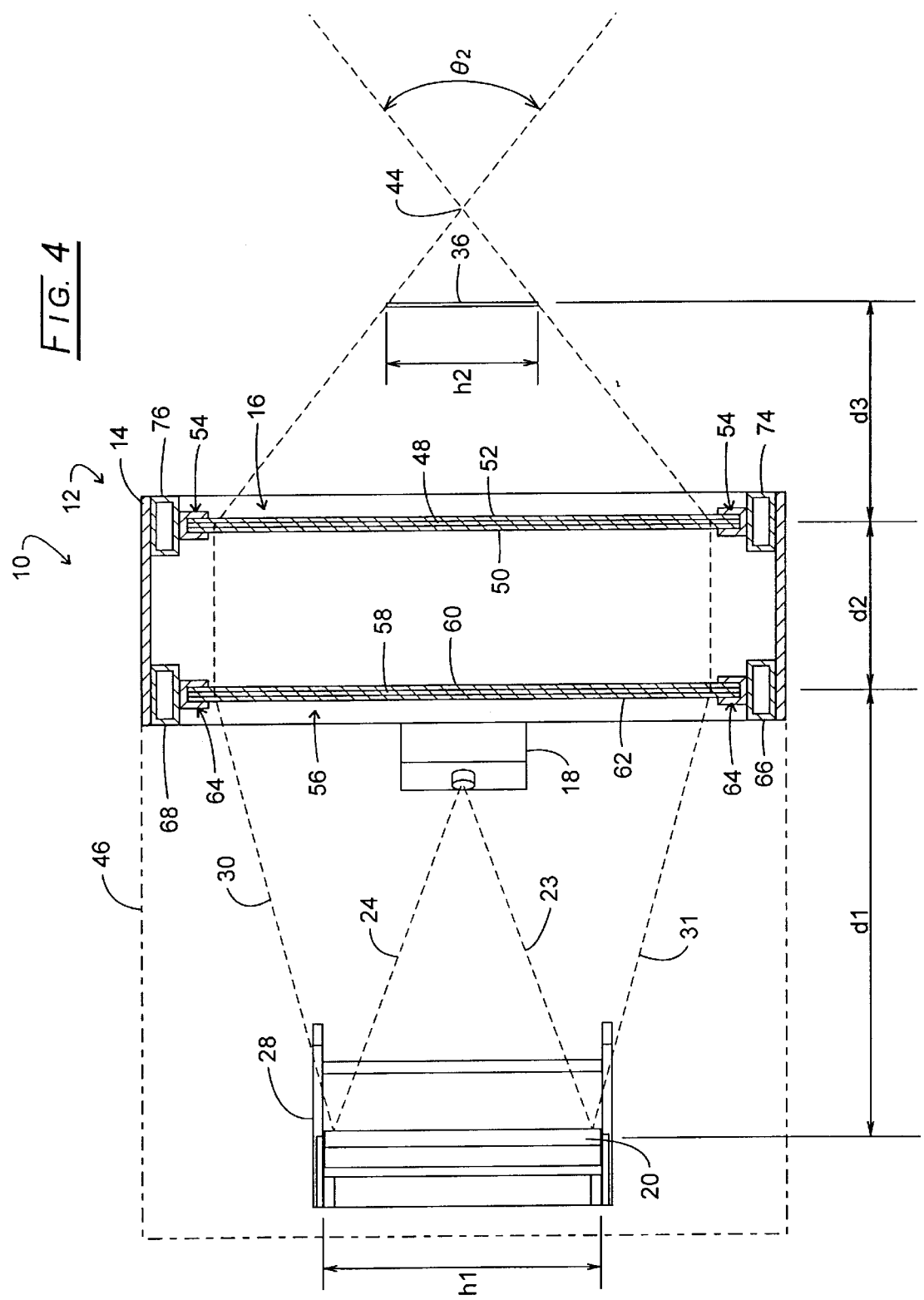
FIG. 4 is a sectional view taken through the plane 4—4 shown in FIG. 2.

Returning to FIG. 4, lens frame 54 is seen to be supported by upstanding box beams 74 and 76. The figure additionally reveals the horizontal field of view $\theta_2$ which for the embodiment shown is 86°. In general, the field of view $\theta$ for either horizontal or vertical direction is preferred to fall within a range of about 60 to 90°. The field of view should be at least about 30°. FIG. 4 also shows a representation $d_1$ for a system back focal length; a spacing between the Fresnel lenses 48 and 58 of $d_2$ and a system forward focal length of $d_3$. For the system 10, the system back focal length $d_1$ is 72 inches (1.83 m) and the output focal length $d_3$ is 37 inches (94 cm).

Now considering the doublet 12, in each doublet utilized with the system, the two Fresnel lenses as at 48 and 58 act as a single optical element. Each of the Fresnel lenses exhibits an F number and focal length. However, acting as a doublet, the F number will change, for example, to one-half that of the individual Fresnel lenses. The doublet will exhibit an F number of between about 0.5 and 1.5. The spacing of the Fresnel lenses $d_2$ typically will range from about 3 inches to 2 feet, but will be equal to or less than one-half the focal length of one of the Fresnel lenses forming the doublet. As another criterion for the value of the distance of the spacing $d_2$, that spacing should be selected as large enough to avoid the formation of moiré fringe effects at the image 36. Each of the Fresnel lenses as at 48 and 58 will exhibit a given F number. However, the F number of the doublet 12 will be different and typically one-half of the F number of the individual lenses forming it when each of the two individual lenses comprising the doublet have the same focal length. The doublet 12 also will exhibit a unique focal distance. When designing systems as at 10, a starting rule of thumb is utilized, wherein the system back focal length $d_1$, is selected as three times the doublet focal length. This will create a system forward focal length $d_3$ of one and one-half times the doublet focal length. In general, this will provide for a reduction in size of the image representing the luminous transmission object at the screen 20 from a principal dimension of $h_1$ to one-half size as shown at $h_2$ in the figure. The system back focal length $d_1$ should be at least two times the focal length of the doublet 12 and for special cases has been reduced as low as 1.5 times the doublet focal length. For all cases, the size of the aperture 56 should be at least as great as the corresponding dimension of the luminous transmission object at screen 20. One fundamental reason for the utilization of doublets as at 12 is that the optical system is faster for larger fields of view and other special effects such as that accentuating field curvature. Such fast systems permit the formation of the output image plane as at 36 at locations closer to the exit aperture 16. A three-dimensional emulation also is possible with the system by purposely creating a field curvature at the focal plane 36 and through a deliberate creation of chromatic astigmatism in the system. With such an arrangement, select coloration is used at the luminous transmission object, for example, at screen 20. The image of a red ball will be projected more forwardly than a corresponding blue ball. A green ball image component will be intermediate the red and blue objects. Thus, a three-dimensional emulation is achievable by selecting components of the object image from different regions of the visible spectrum.

Figure 5:
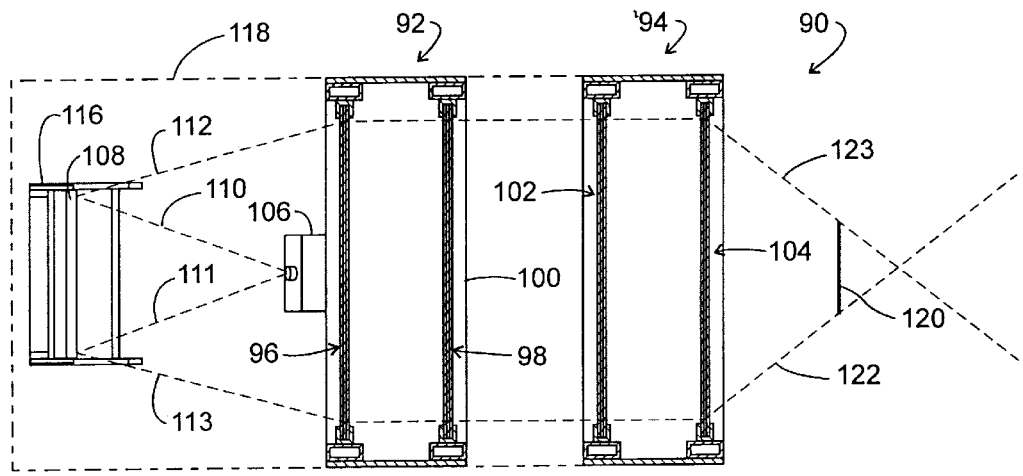
FIG. 5 is a top view of another embodiment of the invention employing two doublets.

Fast optical systems are desirable when the design calls for a warped or distorted focal plane 36. For such designs, it further is desirable to achieve a wider field of view and higher image fidelity. In general, it is desirable to employ two doublets for such designs. Looking to FIG. 5, an optical system 90 is seen to incorporate two doublets represented generally at 92 and 94. Doublet 92 is constructed in the manner of doublet 12, having two Fresnel lens assemblies 96 and 98 mounted within an enclosure 100. In similar fashion, doublet 94 is formed of two Fresnel lens assemblies 102 and 104. In the figure, the two doublets are shown separated by the minimum preferred distance. This preferred separation is a distance equal to 2 to 4 times the resulting focal length of the doublet with a typical measurement equal to three times a single doublet's focal length. A projection TV system including video projector 106 and projection screen 108 establish the luminous transmission object of the system 90 at screen 108, projection from projector 106 being represented at dashed projection lines 110 and 111, and corresponding projection from screen 108 being represented at projection lines 112 and 113. As before, the screen 108 is mounted upon an L-shaped frame 116 and the system is located within a confinement arrangement such as a room from the exit aperture represented at Fresnel lens assembly 104 rearwardly to the screen 108 as represented by the dashed boundary 118. Thus, all ambient or stray light is blocked by the confinement arrangement 118. The system output focal plane is represented at 120 in conjunction with dashed projection lines 122 and 123.

Figure 6:
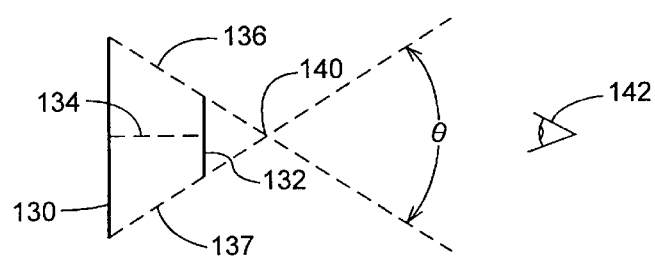
FIG. 6 is a schematic diagram showing a computation of field of view.

Field of view is an important attribute of the system, representing a salient aspect to achieving an object form of parallax where the observer eye station may be moved around an image which is coincident with a purposely warped output focal plane or flat focal plane using chromatic aberation to achieve depth. Such field of view is determined for a given system by considering the attributes of aperture size; projection distance; and projected image size. Looking to FIG. 6, these attributes are schematically represented. In the figure, the output aperture is represented at 130 and the output focal plane is represented at 132. Focal plane 132 is located a projection distance in front of the aperture 130 as is represented by dashed line 134. Projection lines are seen to extend from the extremities of the output aperture 130 to touch the extremities of image 132 as represented by dashed projection lines 136 and 137. Projection lines 136 and 137 cross at a vertex 140 to define the field of view, generically referred to as $\theta$ presented before the eye station 142. This angle, $\theta$ readily is determined using conventional plane geometry in conjunction with the values for projected image size, exit aperture size, and projection distance.

Figure 7A:
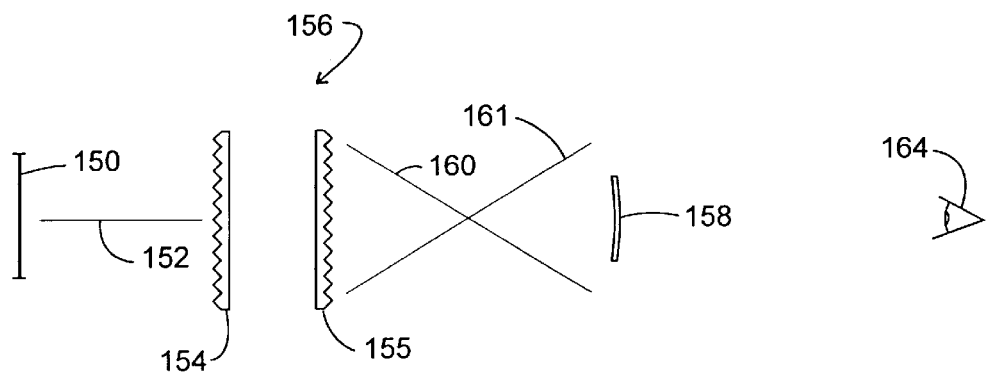
FIGS. 7A and 7B are schematic diagrams showing two doublet embodiments of the system.

As noted earlier herein, a salient aspect of the invention resides in the positioning of the Fresnel lenses thereof both within a doublet configuration and in a manner wherein the echelon grooves thereof are oppositely oriented within the optical path. A determination as to whether the echelon grooves are to face mutually inwardly toward each other or mutually outwardly away from each other is a function of their manufacture. In this regard, their orientation will be opposite depending upon whether they are formed in positive relief or negative relief. This arrangement of the echelon grooves of Fresnel lenses, for a positive relief form of structure, is schematically illustrated in FIG. 7A. In the figure, the luminous transmission object is represented at 150 and its projection along a common optical path is represented by line 152. Fresnel lenses carrying positive relief echelon grooves are represented at 154 and 155 forming a doublet 156. The substantially planar transmitted focal plane is represented at 158 in conjunction with projection lines 160 and 161. With this arrangement, the eye station 164 perceives an image coincident with a substantially planar focal plane 158. It may be noted from the above discussion that depth effects with images at focal plane 158 may be developed to take advantage of chromatic aberation.

Figure 7B:
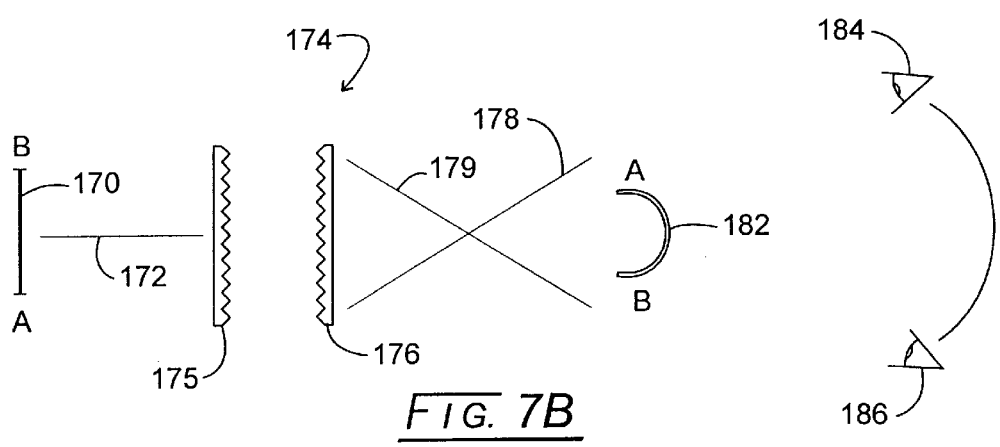

Turning now to FIG. 7B, the luminous transmission object appears as line 170 having image end position components represented at A and B. This image is positioned within an optical path represented at line 172 for projection to a doublet 174 formed of Fresnel lenses 175 and 176. In this embodiment, the positive relief Fresnel lenses 175 and 176 are positioned such that their echelon grooves are mutually inwardly facing toward each other within the optical path 172. A resulting projection is represented at projection lines 178 and 179 to create a curved output focal plane 182. The image coincident with the rounded focal plane 182 derives from the flat image 170 and a right-left reversal will position the earlier-noted end position components of the image A, B at opposite sides of the focal plane. Thus an observer at eye station 184 will see one side of the projected image including the image component A. Moving within the field of view to eye station 186 provides the observer with a view of image component B. This is a demonstration of object parallax as opposed to spatial parallax.

Figure 7C:
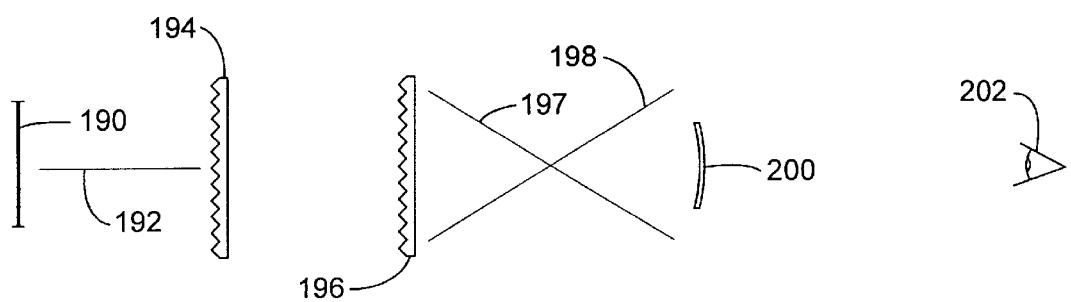
FIG. 7C is a corresponding schematic representation of prior art optical systems utilizing Fresnel lenses.

Looking to FIG. 7C, a schematic representation of corresponding prior art is revealed. In the figure, a luminous image or transmission object is represented at 190 being projected along path 192 to a stand-alone Fresnel lens 194. From the lens 194, an autocollimated image is projected to a next Fresnel lens 196. Note that the echelon grooves of Fresnel lenses 194 and 196 point in the same direction along the optical path 192. A resultant projected image is represented at 200 in conjunction with projection lines 197 and 198. The eye station for the system is represented at 202. With the non-doublet arrangement, in general, lower F numbers are called for the individual lenses and there is a distracting tendency for light scatter and glow phenomena. Controlled field curvature as well as image quality control available with a doublet configuration is elusive with such systems.

It should be noted for clarification that the term "large aperture lenses (optics)", as it applies to the instant invention, should be considered to mean optics of a size where the diameter is larger than the typical interocular spacing of the human eyes (approximately 7–9 cm) so as to distinguish from common sized optics used in cameras, projectors, and other such imaging systems.

Since certain changes may be made in the above system and method without departing from the scope of the invention herein involved, it is intended that all matter contained in the above description or shown in the accompanying drawings shall be interpreted as illustrative and not in a limiting sense.

I claim:

1. A system for generating an image in free space; comprising:

first and second planar Fresnel lenses formed with echelon grooves, mounted in parallel adjacency and spaced apart a distance, d, to define a doublet exhibiting a doublet focal length;

a luminous transmission object positioned at a back focal length corresponding with a select multiple of said doublet focal length having a principal object dimension, said back focal length being 1.5 or greater times the focal length; and said doublet being dimensioned having a peripheral extent defining an optical aperture at lease corresponding with said principal object dimension.

2. The system of claim 1 in which said echelon grooves of said first and second Fresnel lenses are mutually oppositely oriented to define said doublet.

3. The system of claim 1 in which said doublet is configured to exhibit an F number of between about 0.5 and 1.5.

4. The system of claim 1 in which said first and second Fresnel lenses are spaced apart said distance, d, corresponding with a value of less than one-half the focal length of one said first and second lens.

5. The system of claim 4 in which said distance d is selected having a value effective to avoid the formation of moiré fringe effects at said image in free space.

6. The system of claim 1 in which:

said first Fresnel lens is in confronting relationship with said luminous transmission object and is spaced therefrom a system back focal length;

said doublet derives a projected image corresponding with said luminous transmission object exhibiting a projected image size and located a projection distance forwardly of said second Fresnel lens; and said system exhibits a field of view, θ, corresponding with said projected image size, said projection distance and said optical aperture.

7. The system of claim 6 in which said field of view, θ, is at least about 30 degrees.

8. The system of claim 6 in which said field of view, θ, is within a range of about 60 degrees to 90 degrees.

9. The system of claim 6 in which said system includes confinement means extending from said second Fresnel lens to said luminous transmission object for blocking the ingress of ambient illumination.

10. The system of claim 1 in which:

said doublet derives a projected image at an output focal plane corresponding with said luminous transmission object; and said echelon grooves of said first and second Fresnel lenses are in a mutually opposite orientation effective to derive a substantially flat output focal plane.

11. The system of claim 10 in which:

said echelon grooves are configured in negative relief; and said echelon grooves of said first and second Fresnel lenses face mutually inwardly toward each other.

12. The system of claim 10 in which:

said echelon grooves of said first and second Fresnel lenses are configured in positive relief; and said echelon grooves of said first and second Fresnel lenses face mutually outwardly from each other.

13. The system of claim 1 including:

third and fourth planar Fresnel lenses formed with echelon grooves, mounted in parallel adjacency and spaced apart to define a second doublet exhibiting a second doublet focal length;

said second doublet being aligned within an optical path in common with said doublet, said third Fresnel lens confronting said second Fresnel lens and being spaced a predetermined distance along said common optical path and said fourth Fresnel lens representing an exit aperture of said system;

said echelon grooves of said first and second Fresnel lenses being mutually oppositely oriented; and said echelon grooves of said third and fourth Fresnel lenses being mutually oppositely oriented.

14. The system of claim 13 in which said predetermined distance along said common optical path is less than twice said second doublet focal length.

15. A method for generating an image in fee space, comprising the steps of:

providing an image generator actuable to produce a luminous transmission object of principal image dimension;

providing a doublet formed of first and second planar Fresnel lenses mounted in parallel adjacency, spaced apart a distance, d, each having echelon grooves formed at a surface thereof, said doublet exhibiting a doublet focal length, and said doublet being dimensioned to have an optical aperture at lease coextensive with said principal image dimension;

positioning said doublet in a common optical path with said luminous transmission object at a system back focal distance of at least about 1.5 times said doublet focal length and deriving therefrom a system forward focal length extending from said second Fresnel lens to an output focal plane of predetermined shape; and actuating said image generator to produce a projected image in free space coincident with said output focal plane and corresponding with said luminous transmission object, said image exhibiting a projected image size no greater than said principal object dimension, at a projection distance.

16. The method of claim 15 in which said doublet is positioned at a said system back focal distance selected to reduce a dimension of said projected image corresponding with said principal image dimension.

17. The method of claim 15 in which said doublet is provided having said echelon grooves of said first and second Fresnel lenses mutually oppositely oriented within said optical path.

18. The method of claim 15 in which:

said doublet is positioned within said common optical path to provide a said system back focal distance for deriving a predetermined said projected image size and projection distance; and said optical aperture, said predetermined projected image size and said projection distance are selected to provide a field of view, θ, of at least about 30 degrees.

19. The method of claim 18 in which said field of view, θ, is selected within a range of about 60 degrees to 90 degrees.

20. A system for generating an image in free space, comprising:

first and second planar Fresnel lenses formed with echelon grooves, mounted in parallel adjacency and spaced apart a distance, d, to define a doublet exhibiting a doublet focal length;

a luminous transmission object positioned at a back focal length corresponding with a select multiple of said doublet focal length having a principal object dimension;

said doublet being dimensioned having a peripheral extent defining an optical aperture at least corresponding with said principal object dimension;

said luminous transmission object is configured having first and second image components exhibiting respective first and second mutually distinct regions of the visible spectrum;

said doublet derives a projected image about an optical axis at an output focal plane corresponding with said luminous transmission object;

said echelon grooves of said first and second Fresnel lenses are in a mutually opposite orientation effective to warp said output focal plane; and said distance, d, spacing said first and second Fresnel lenses apart and said echelon groove orientations are selected to evoke chromatic aberration at said projected image effective to space apart components of said projected image along said optical axis corresponding with said luminous transmission object first and second image components.

21. The system of claim 20 in which:

said echelon grooves are configured in negative relief; and said echelon grooves of said first Fresnel lens face away from said echelon grooves of said second Fresnel lens.

22. The system of claim 20 in which:

said echelon grooves are configured in positive relief; and said echelon grooves of said first and second Fresnel lenses face mutually inwardly toward each other.

23. A system for generating an image in free space, comprising:

first and second planar Fresnel lenses formed with echelon grooves, mounted in parallel adjacency and spaced apart a distance, d, to define a doublet exhibiting a doublet focal length;

a luminous transmission object positioned at a back focal length corresponding with a select multiple of said doublet focal length having a principal object dimension;

said doublet being dimensioned having a peripheral extent defining an optical aperture at least corresponding with said principal object dimension;

said doublet derives a projected image at an output focal plane corresponding with said luminous transmission object; and said echelon grooves of said first and second Fresnel lenses are in a mutually opposite orientation effective to substantially warp said output focal plane.

24. The system of claim 23 in which:

said echelon grooves are configured in negative relief; and said echelon grooves of said first Fresnel lens face away from said echelon grooves of said second Fresnel lens.

25. The system of claim 23 in which:

said echelon grooves are configured in positive relief; and said echelon grooves of said first and second Fresnel lenses face mutually inwardly toward each other.

26. A method for generating an image in free space, comprising the steps of:

providing an image generator actuable to produce a luminous transmission object of principal image dimension;

providing a doublet formed of first and second planar Fresnel lenses mounted in parallel adjacency, spaced apart a distance, d, each having echelon grooves formed at a surface thereof, said doublet exhibiting a doublet focal length, and said doublet being dimensioned to have an optical aperture at least coextensive with said principal image dimension;

positioning said doublet in a common optical path with said luminous transmission object at a system back focal distance corresponding with a select multiple of said doublet focal length and deriving therefrom a system forward focal length extending from said second Fresnel lens to an output focal plane of predetermined shape;

actuating said image generator to produce a projected image coincident with said output focal plane and corresponding with said luminous transmission object;

said image generator is provided to produce said luminous transmission object having first and second image components exhibiting respective first and second mutually distinct regions of the visible spectrum;

said doublet is provided having said echelon grooves of said first and second Fresnel lenses in mutually opposite orientation within said optical path selected to distort said output focal plane and said doublet is configured to evoke chromatic astigmatism; and said image generator is actuated to effect formation of said projected image with components spaced apart along said optical axis corresponding with said luminous transmission object first and second image components.

27. The method of claim 26 in which said doublet is provided with said echelon grooves being configured in positive relief; and said echelon grooves of said first and second Fresnel lenses face mutually inwardly toward each other within said optical path.

28. The method of claim 26 in which said doublet is provided with said echelon grooves being configured in negative relief; and said echelon grooves of said first Fresnel lens face away from said echelon grooves of said second Fresnel lens with said optical path.

29. A system for generating an image in free space, comprising:

first and second planar Fresnel lenses formed with echelon grooves, mounted in parallel adjacency and spaced apart a distance, d, to define a doublet exhibiting a doublet focal length;

a luminous transmission object positioned at a back focal length corresponding with a select multiple of said doublet focal length having a principal object dimension;

said doublet being dimensioned having a peripheral extent defining an optical aperture at least corresponding with said principal object dimension; and wherein said first Fresnel lens is in confronting relationship with said luminous transmission object and is spaced therefrom a system back focal length of about three times said doublet focal length.

30. A method for generating an image in free space, comprising the steps of:

providing an image generator actuable to produce a luminous transmission object of principal image dimension;

providing a doublet formed of first and second planar Fresnel lenses mounted in parallel adjacency, spaced apart a distance, d, each having echelon grooves formed at a surface thereof, said doublet exhibiting a doublet focal length, and said doublet being dimensioned to have an optical aperture at least coextensive with said principal image dimension;

positioning said doublet in a common optical path with said luminous transmission object at a system back focal distance corresponding with a select multiple of said doublet focal length and deriving therefrom a system forward focal length extending from said second Fresnel lens to an output focal plane of predetermined shape;

actuating said image generator to produce a projected image coincident with said output focal plane and corresponding with said luminous transmission object; and wherein said system back focal distance is provided as about three times said doublet focal distance.

31. A method for generating an image in free space, comprising the steps of:

providing an image generator actuable to produce a luminous transmission object of principal image dimension;

providing a doublet formed of first and second planar Fresnel lenses mounted in parallel adjacency, spaced apart a distance, d, each having echelon grooves formed at a surface thereof, said doublet exhibiting a doublet focal length, and said doublet being dimensioned to have an optical aperture at least coextensive with said principal image dimension;

positioning said doublet in a common optical path with said luminous transmission object at a system back focal distance corresponding with a select multiple of said doublet focal length and deriving therefrom a system forward focal length extending from said second Fresnel lens to an output focal plane of predetermined shape;

actuating said image generator to produce a projected image coincident with said output focal plane and corresponding with said luminous transmission object; and said doublet is provided having said echelon grooves of said first and second Fresnel lenses mutually oppositely oriented within said optical path effective to warp said output focal plane in emulation of a portion of a sphere.

* * * * *